(12) United States Patent
Ho et al.

(10) Patent No.: US 7,769,909 B2
(45) Date of Patent: Aug. 3, 2010

(54) DEVICE AND METHOD FOR ACCESS TIME REDUCTION BY SPECULATIVELY DECODING NON-MEMORY READ COMMANDS ON A SERIAL INTERFACE

(75) Inventors: On-Pong Roderick Ho, Milpitas, CA (US); Dixie Nguyen, San Jose, CA (US); Dinu Patrascu, Sunnyvale, CA (US)

(73) Assignee: Atmel Corporation, San Jose, CA (US)

( * ) Notice: Subject to any disclaimer, the term of this patent is extended or adjusted under 35 U.S.C. 154(b) by 283 days.

(21) Appl. No.: 11/566,555

(22) Filed: Dec. 4, 2006

(65) Prior Publication Data

US 2008/0133779 A1    Jun. 5, 2008

(51) Int. Cl.
G06F 3/00 (2006.01)
G06F 5/00 (2006.01)

(52) U.S. Cl. ............... 710/5; 710/36; 710/37; 710/38; 710/39; 710/40; 710/50

(58) Field of Classification Search ......... 710/5
See application file for complete search history.

(56) References Cited

U.S. PATENT DOCUMENTS

| 5,663,922 | A | * | 9/1997 | Tailliet ............ 365/240 |
| 6,038,185 | A | | 3/2000 | Ng et al. |
| 6,097,657 | A | * | 8/2000 | Ng et al. .......... 365/221 |
| 2005/0162144 | A1 | | 7/2005 | Kernahan |
| 2006/0095750 | A1 | | 5/2006 | Nye et al. |
| 2008/0109577 | A1 | * | 5/2008 | Azevedo et al. ....... 710/51 |

FOREIGN PATENT DOCUMENTS

WO    WO-2008/070500 A2    6/2008

OTHER PUBLICATIONS

Atmel, 32-bit Embedded ASIC Core Peripheral: Serial Peripheral Interface (SPI), Atmel corporation, Jun. 2004, pp. 1-4.*
"International Application Serial No. PCT/US2007/085800, International Search Report mailed Jun. 18, 2008", 2 pgs.
"International Application Serial No. PCT/US2007/085800, Written Opinion mailed Jun. 18, 2008", 5 pgs.

* cited by examiner

*Primary Examiner*—Alford W Kindred
*Assistant Examiner*—Brooke J Dews
(74) *Attorney, Agent, or Firm*—Schwegman, Lundberg & Woessner, P.A.

(57) ABSTRACT

An apparatus and method of speculatively decoding non-memory read commands. A command register and decoder, within the apparatus, compares high-order command bits provided on a serial bus with corresponding bits of recognized non-memory read commands. An early non-memory read command is asserted when incoming command bits match a non-memory read command. Early responsive data is prepared speculatively during the time the remainder of command bits is received and decoded. A determination of command speculation correctness is made after receipt of the full command. If the full command received is not the speculated non-memory read command, the prepared data is discarded. Earlier prepared data is produced as the subsystem response if the full command matches the speculative non-memory read command. For incoming commands with operands, such as an address, the same speculative determination based on high-order operand bits is performed.

19 Claims, 4 Drawing Sheets

Fig. _ 1

DEVICE AND METHOD FOR ACCESS TIME REDUCTION BY SPECULATIVELY DECODING NON-MEMORY READ COMMANDS ON A SERIAL INTERFACE

TECHNICAL FIELD

The present invention relates to reducing access time of internal registers of an electronic device. More specifically, this invention concerns speculative decoding of serial commands.

BACKGROUND ART

The serial peripheral interface (SPI) is a synchronous serial interface providing full-duplex communication between two or more devices. One device becomes configured as a master and another is configured as a slave. The master initiates transfers in communication with a slave, controls a serial clock provided to all slaves and provides a chip select signal to access a targeted slave. A typical slave may be a peripheral device in a system, such as a printer, a sensor, a display driver, or a memory device.

Typically, the interface between serial peripheral interface devices is configured with four wires and their associated signals. A serial clock (SCLK) signal is controlled by the master and distributed to all slave devices in the system. A slave select (SS) signal, or alternatively, a chip select (CS) signal, is also provided to all slave devices. In a first alternative configuration, all devices are connected in series in a cascaded connection. In this situation, a single chip select signal is provided in parallel to all cascaded slaves. With an output of a given slave device connected to the input of a subsequent slave device in the cascade configuration, the single chip select and the appropriate number of clocks allows all slave devices to operate as one large capacity device. This alternative keeps to a minimum the amount of logic required in the master for determining a targeted slave.

In a second alternative configuration, a master selects one of many slaves for communication. The master contains appropriate logic to determine a single one of the many slaves for selection and asserts a single chip select signal for the targeted slave. A chip select line is provided from the master to each of the slave devices to effect the access of a single one of the slaves according to the additional selection logic.

The third and fourth wires of the interface carry serial data to and from master and slave. Data is carried from master to slave by the Master-Out-Slave-In (MOSI) wire. Alternatively, data from the slave to the master is provided by the Master-In-Slave-Out (MISO) wire from each slave that communicates with the master.

A benefit of a serial communication interface is that wiring is simpler due to data being transferred over a single wire in each direction instead of there being a wire for each bit of data. An additional benefit is that the simpler wiring reduces electrical cross-talk effects. The reduction in cross-talk allows an additional benefit in that connections are typically able to span a greater distance since signal quality is not degraded by the cross-talk effects encountered in configurations wired in parallel.

Increasing performance requirements in serial buses means that both memory read and non-memory read commands need be decoded and responded to within ever decreasing cycle times. As memory read access times have steadily decreased, a corresponding decrease in non-memory read times has been both a requirement and a challenge. Performance increases of internal memory and a corresponding reduction in read-cycle times of memory arrays has created an a critical requirement for producing results for a non-memory read-cycle time in order to prevent non-memory read commands from becoming a critical limitation of system performance. What is needed it is a way to determine a potential non-memory read command as early as possible in order to prepare a response to the non-memory class of command as quickly as is possible for the memory reads of the same system.

SUMMARY

In one embodiment, a speculative command decode serial interface device comprises a command decode register configured to decode a high-order portion of command bits input on a serial input pin coupled to the command decode register and speculatively produce a non-memory read command, at least one data register for retaining data associated with a corresponding non-memory read command, an interface logic block configured to produce a selection of non-memory read data and enable output of non-memory read data from the serial interface device, the interface logic block coupled to the command decode register and the at least one data register, a data multiplexer configured to provide read data from a selected one of the at least one data registers to an output of the data multiplexer, the data multiplexer coupled to the at least one data register and the interface logic block, a data sequencer configured to queue read data, the data sequencer coupled to the interface logic block and the output of the data multiplexer; and an output register configured to output read data based on an enabling indication from the interface logic block, the output register coupled to the data sequencer and the interface logic block.

In another embodiment, a speculative command decode serial interface device comprises a means for decoding a high-order portion of command bits input on a serial input pin and speculatively producing a non-memory read command, at least one means for retaining non-memory read data related to a corresponding non-memory read command, a means for determining data configured to determine a selection of non-memory read data and enable output of non-memory read data from the serial interface device, the means for determining coupled to the means for decoding and the at least one means for retaining non-memory read data, a means for selecting data configured to select one of the at least one means for retaining non-memory read data, the means for selecting being coupled to the at least one means for retaining non-memory read data and the means for determining, a means for queuing data coupled to the means for determining and the means for selecting; and a means for outputting read data based on an enabling indication from the means for determining, the means for outputting coupled to the means for queuing and the means for determining.

In a further case, the embodiment is a method of speculatively decoding a non-memory read command, the method comprising inputting a command to a decode register of a serial interface logic block, decoding a first portion of the command comprising high-order command bits, determining if the first portion of the command decoded corresponds to a first portion of a non-memory read command, and selecting at least one data register corresponding to the non-memory read command.

DETAILED DESCRIPTION

Figure 1:
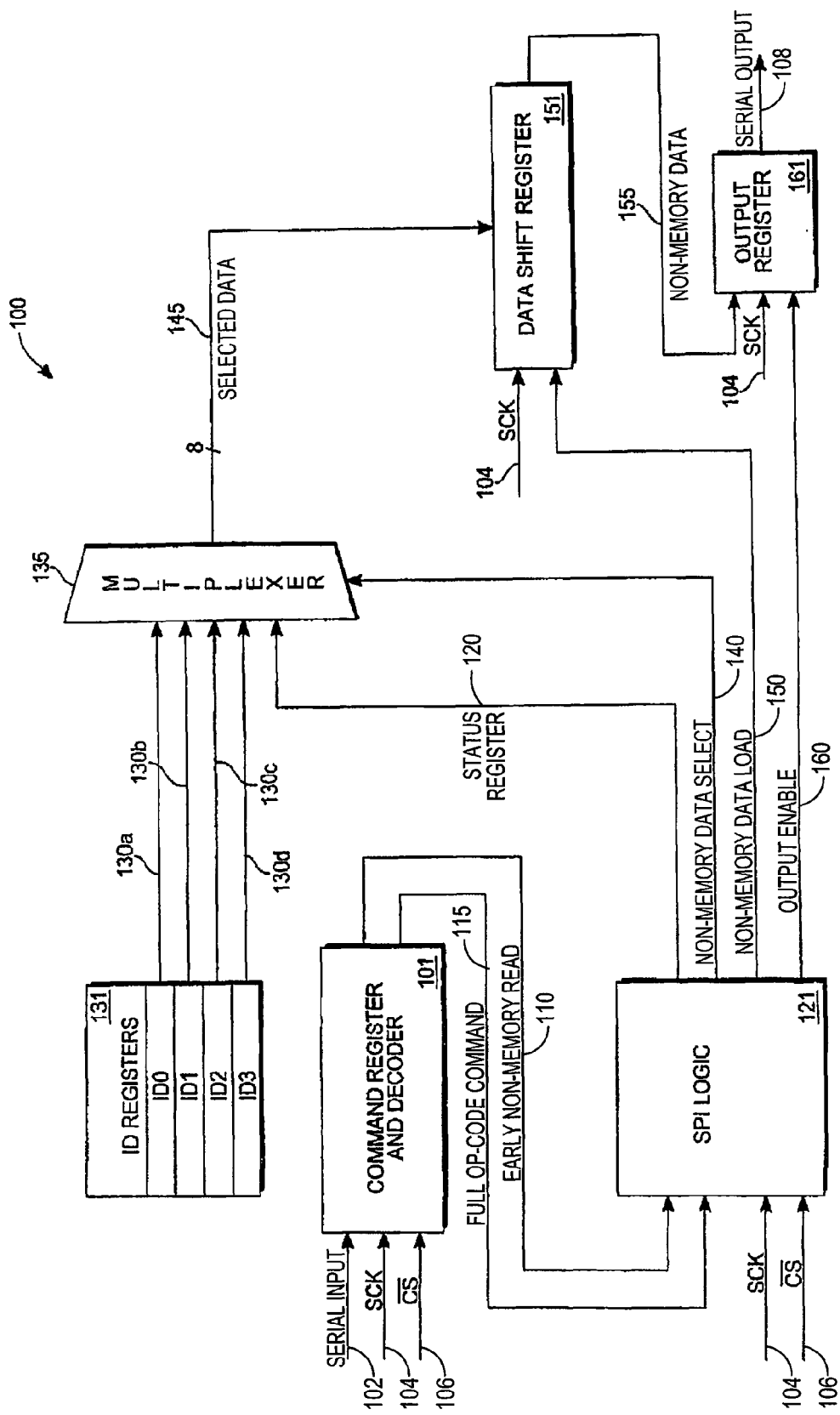
FIG. 1 is a logic block diagram of an exemplary serial interface with speculative decode capability.

With reference to FIG. 1, a serial input line 102 couples a serial input signal SI to a command register and decoder 101 in a exemplary block diagram of a serial interface 100 containing speculative decode capability. A serial clock line 104 and chip_select-bar line 106 provide a serial clock signal SCK and a chip_select-bar signal $\overline{CS}$ to the command register and decoder 101, respectively. An early_non-memory_read bus 110, and a full_opcode_command bus 115 couple the command register and decoder 101 to an SPI logic block 121.

A status_register bus 120 couples the SPI logic block 121 to a multiplexer 135. A non-memory_data_select bus 140 couples an output of the SPI logic block 121 to a selection input of the multiplexer 135. The non-memory_data_select bus 140 is for making a data selection. A set of ID registers, for example four ID registers ID0-ID3 within an ID registers block 131 couple through ID output buses 130a-130d to the multiplexer 135. An eight-bit-wide selected_data bus 145 couples an output of the multiplexer 135 to a data shift register 151. A non-memory_data bus 155 couples an output of the data shift register 151 to an output register 161.

A serial output line 108 couples a serial output signal SO from the output register 161 to an output pat (not shown). A non-memory_data_load line 150 couples an output of the SPI logic block 121 to the data shift register 151. An output_enable line 160 couples an output of the SPI logic block 121 to the output register 161. The serial clock line 104 also couples the serial clock signal SCK to the SPI logic block 121, the data shift register 151, and the output register 161. The chip_select-bar line 106 also couples the chip_select-bar signal $\overline{CS}$ to the SPI logic block 121.

In order to determine the efficacy of speculative decoding of the non-memory read class of commands, examples of responses for the fundamental types of commands contained in the class are considered along with a determination of a satisfactory completion of the response in the required time. Consideration is given to register selection, data multiplexing, and scanning out of data for each type of non-memory read command as appropriate.

Figure 2:
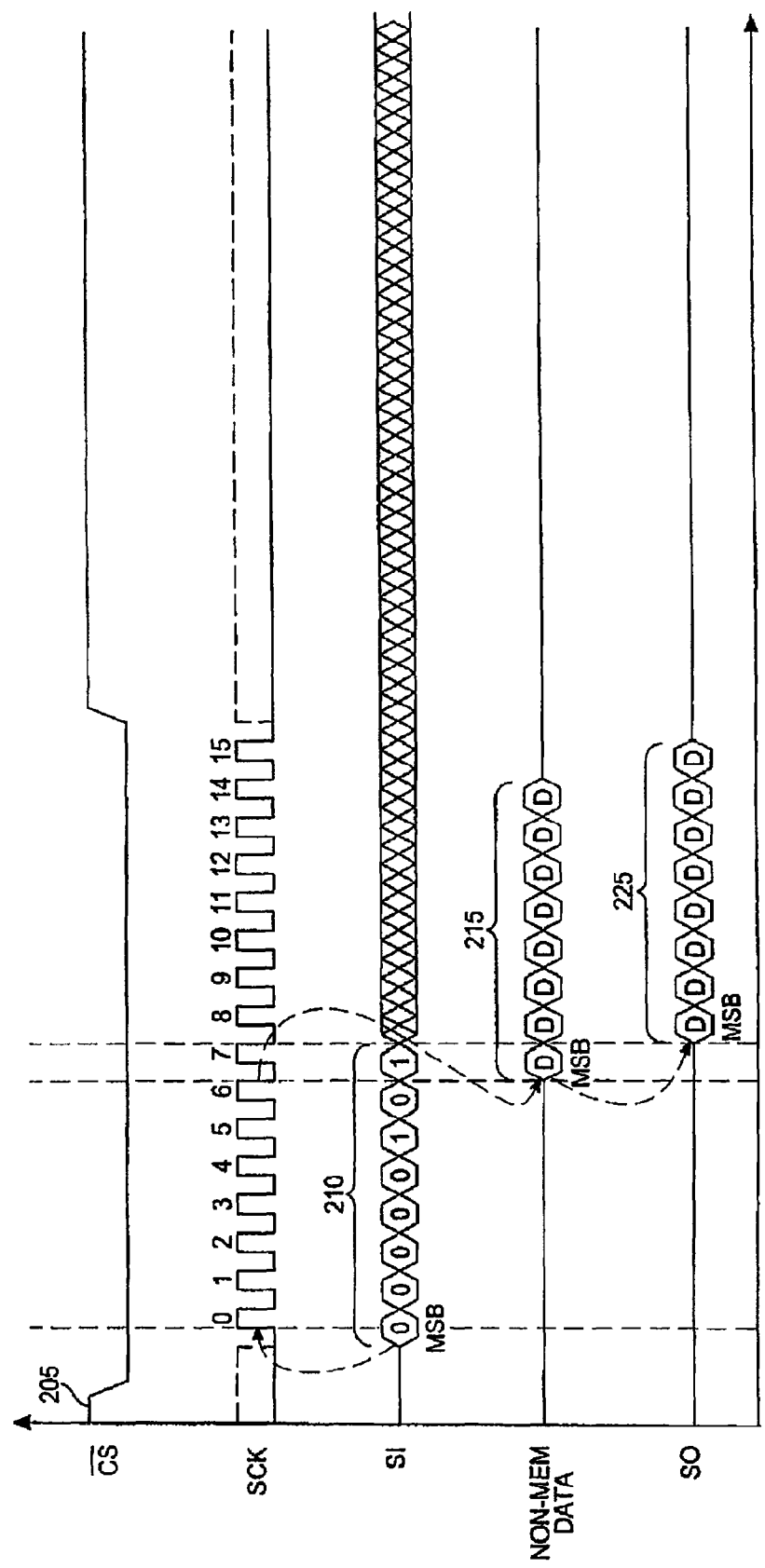
FIG. 2 is a waveform diagram of a non-memory read operation of a register corresponding to FIG. 1.

With reference to FIG. 2, the chip_select-bar signal $\overline{CS}$ transitions 205 from a high to a low level in a waveform diagram to define a non-memory read cycle of a register corresponding to FIG. 1. The serial clock signal SCK begins clocking data bits from the serial input line 102 (FIG. 1) commencing from a low level. If the serial clock signal SCK has been at a high logic level, the signal is brought to a low logic level before commencing a sequence of clocking for a system cycle. Commonly, for serial bus transmissions, data is read on a rising edge and output on a falling edge of the serial clock signal SCK. Additionally, it is generally true that a most-significant bit of a byte is transferred first in a serial transmission.

A rising edge of a first cycle of the serial clock signal SCK clocks in the most significant bit of an exemplary read-status-register command 210. The eight bit values of the read-status-register command 210 are, for example, 00000101b (b for binary notation). In the prior art, the entire set of eight bits of the read-status-register command 210 would be read by a decoder function before internal logic operations of the command would commence. This created a timing requirement for internal logic to be able to produce the appropriate response in a half clock cycle. As system performance increases, the duration of a clock cycle is reduced, meaning a greater demand on the performance of the logic to produce a result in the partial cycle is required.

In contrast, in FIG. 2, the first seven bits of the input command are read by the command register and decoder 101 and a determination is made as to whether these seven bits correspond to the first seven bits of, for example, the read-status-register command 210. The determination is made by the seventh cycle (i.e., by cycle 6) of the serial clock signal SCK from a data stream on the serial input clock signal SI. By cycle 6 of the serial clock signal SCK the command register and decoder 101 speculatively determines that a read-status-register command 210 is likely to be completely received by cycle 7 of the serial clock signal SCK.

The first seven bits of the command byte are received, decoded by the command register and decoder 101. Up to this point in decoding, the first seven bits of the command byte are determined to speculatively correspond to a complete read-status-register command 210. With reference to FIG. 1, on speculation, the command register and decoder 101 provides an early internal read-status-register command (not shown) to the SPI logic block 121 over the early_non-memory_read bus 110. Within the SPI logic block 121 additional logic selects a status register (not shown) and provides contents of the status register to the multiplexer 135 over the status_register bus 120.

In response to the indication of a read-status-register command 210, the SPI logic block 121 also provides a selection signal (not shown) over the non-memory_data_select bus 140 to the multiplexer 135. The selection signal applied to the multiplexer 135 causes the status register contents to be provided from the multiplexer 135 to the data shift register 151 over the selected_data bus 145. Referring again to FIG. 2, commencing with a most-significant bit (MSB) of an eight bit byte of data corresponding to the status register contents 215, is provided as a first portion of the NON-MEM DATA signal. The first command bit of the status register contents 215 is provided to the output register 161 over the non-memory_data bus 155 (FIG. 1) commencing on the falling edge of cycle 6 of the serial clock signal SCK and continues for the subsequent seven cycles of the serial clock signal SCK. Transfer of the status register contents 215 is controlled by a non-memory_data_load signal (not shown) on the non-memory_data_load line 150.

A last bit of the command byte on the serial input line 102 (FIG. 1) is read into the command register and decoder 101 on the rising edge of cycle 7 of the serial clock signal SCK. The command register and decoder 101 is able to determine whether a read-status-register command 210 is confirmed as the command byte on the serial input line 102 or not. In the event receipt of a read-status-register command 210 is confirmed, an enable signal (not shown) is asserted from the SPI logic block 121 over the output_enable line 160 to the output register 161. On the falling edge of cycle 7 of the serial clock signal SCK, and commencing with the most-significant bit, the first bit of the status register contents 225 is clocked out to the serial output line 108 as the serial output signal SO.

In the event a read-status-register command 210 is not confirmed, and enable signal is not asserted from the SPI logic block 121. The contents of the status register are not transferred to the output register 161, but rater are purged from the data shift register 151. Sine a read-status-register command 210 is not confirmed, the actual command is decoded by the command register and decoder 101 by cycle 7 and provided to the SPI logic block 121 over the full_opcode_commands bus 115. The speculative decoding of a non-memory read command does not hamper the response to the actual decoding of a memory read command (or any other command) by cycle 7 for the serial interface 100.

Figure 3:
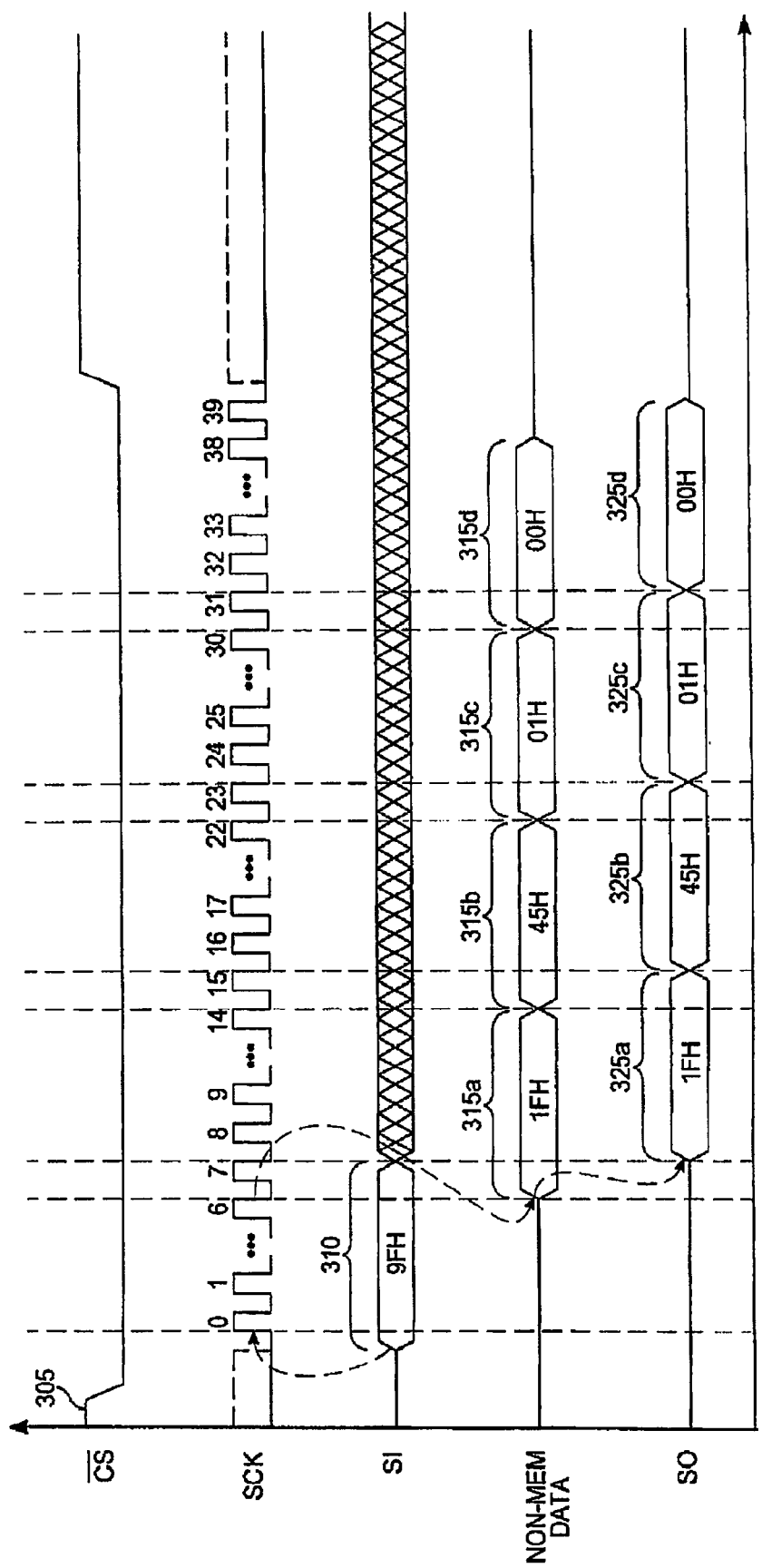
FIG. 3 is a waveform diagram of a non-memory read operation of a plurality of registers corresponding to FIG. 1.

With reference to FIG. 3, the chip_select-bar signal $\overline{CS}$ transitions 305 from a high to a low level in a waveform diagram to define a non-memory read cycle of, for example, four registers of a set of ID registers 131 (FIG. 1). The serial clock signal SCK begins clocking data bits from the serial input line 102 commencing from a low level. If the serial clock signal SCK has been at a high logic level it is brought to a low logic level before commencing a sequence of clocking for a system cycle. Other conditions of serial transmission remain as described above, for instance data is read on a rising edge and output on a falling edge of the serial clock signal SCK and the most-significant bit of a byte is transferred first.

A rising edge of a first cycle of the serial clock signal SCK clocks in the most significant bit of an exemplary read-device-ID command 310. The eight bit values of the read-device-ID command 310 are, for example, 9Fh (h for hexadecimal notation). In the prior art, the entire set of eight bits of the read-device-ID command 310 would be read by a decoder function before internal logic operations of the command would commence. This created a timing requirement for internal logic to be able to produce the appropriate response in a portion of a clock cycle as short as, for example, a half clock cycle. As system performance increases, the duration of a clock cycle reduces, creating a greater demand on the performance of the logic to produce a result in the partial cycle.

In this embodiment, the first seven bits of the read-device-ID command 310 are read by the command register and decoder 101 and a determination is made as to whether these seven bits correspond to the first seven bits of, for example, the read-device-ID command 310. The determination is made by the seventh cycle (i.e., by cycle 6) of the serial clock signal SCK from a data stream on the serial input signal SI. By cycle 6 of the serial clock signal SCK the command register and decoder 101 speculatively determines that a read-device-ID command 310 is likely to be completely received by cycle 7 of the serial clock signal SCK.

The first seven bits of the command byte are received, decoded by the command register and decoder 101, and determined to correspond up to this point to a complete read-device-ID command 310. On speculation, the command register and decoder 101 provides an early internal read-device-ID command (not shown) to the SPI logic block 121 over the early_non-memory_read bus 110.

In response to the early indication of a full read-device-ID command 310, the SPI logic block 121 provides a series of selection signals (not shown) over the non-memory_data_select bus 140 to the multiplexer 135. The series of selection signals applied to the multiplexer 135 causes the contents of the ID registers ID0-ID3 to be provided in sequence from the multiplexer 135 to the data shift register 151 over the selected_data bus 145. Transfer of the contents of the ID registers ID0-ID3 from the multiplexer 135 is controlled by a non-memory_data_load signal (not shown) on the non-memory_data_load line 150. The ID registers ID0-ID3 are hardwired through ID0-ID3 output lines 130a-130d to the multiplexer 135. The contents of the ID registers ID0-ID3 are programmed, on manufacture, with device identification data.

A first byte of device ID data 315a with, for example, a value of 1Fh, is created in the present exemplary embodiment of the serial interface 100 (FIG. 1) at the time of manufacture. Commencing with a most-significant bit, a first bit of the first byte of device ID data 315a is provided as a first portion of the NON-MEM DATA signal. The first byte of device ID data 315a is provided to the output register 161 over the non-memory_data bus 155 commencing on the falling edge of cycle 6 of the serial clock signal SCK. In continuation, over the subsequent seven cycles of the serial clock signal SCK, the remainder of the first byte of device ID data 315a is provided to the output register 161.

A last bit of the command byte on the serial input line 102 is read into the command register and decoder 101 on the rising edge of cycle 7 of the serial clock signal SCK. The command register and decoder 101 is able to determine whether a read-device-ID command 310 is confirmed as the command byte on the serial input line 102 or not. In the event receipt of a read-device-ID command 310 is confirmed, the read-device-ID command 310 is asserted to the SPI logic block 21 over the full_opcode_command bus 115. Upon receipt of the read-device-ID command 310 over the full_opcode_command bus 115, and enable signal (not shown) is asserted from the SPI logic block 121 over the output_enable line 160 to the output register 161. The enable signal is a final gating item that allows the earlier-retrieved speculative data to be the asserted response. On the falling edge of cycle 7 of the serial clock SCK, and commencing with the most-significant bit, bits of the first byte of the device ID data 325a are clocked out sequentially on to the serial output line 108 as the serial output signal SO.

The SPI logic block 121 continues the response to the read-device-ID command 310 and provides, for example, the second through fourth bytes of device ID data 315b-315d of the ID registers ID1-ID3. Through a process similar to that explained above, the second through fourth bytes of device ID data 315b-315d propagate through the selected_data bus 145, the data shift register 151, and over the non-memory_data bus 155 to the output register 161. In response to the read-device-ID command 310, the first through fourth bytes of device ID data 325a-325b are produced in sequence on the serial output line 108 as the serial output signal SO. Through speculatively decoding a read-device-ID command 310, the command register and decoder 101 produces control signaling to provide the device ID data starting on the clock cycle subsequent to receiving the full read-device-ID command 310.

In the event a read-device-ID command 310 is not confirmed, an enable signal is not asserted from the SPI logic block 121. The device ID data are not transferred to the output register 121, but rather are purged from the data shift register 151. Since a read-device-ID command 310 is not confirmed, the actual command is decoded by the command register and decoder 101 by cycle 7 and provided to the SPI logic block 121 over the full_opcode_commands bus 115. The speculative decoding of a non-memory read command does not hamper the response to the actual decoding of a memory read command (or any other command) by cycle 7 for the serial interface 100.

Figure 4:
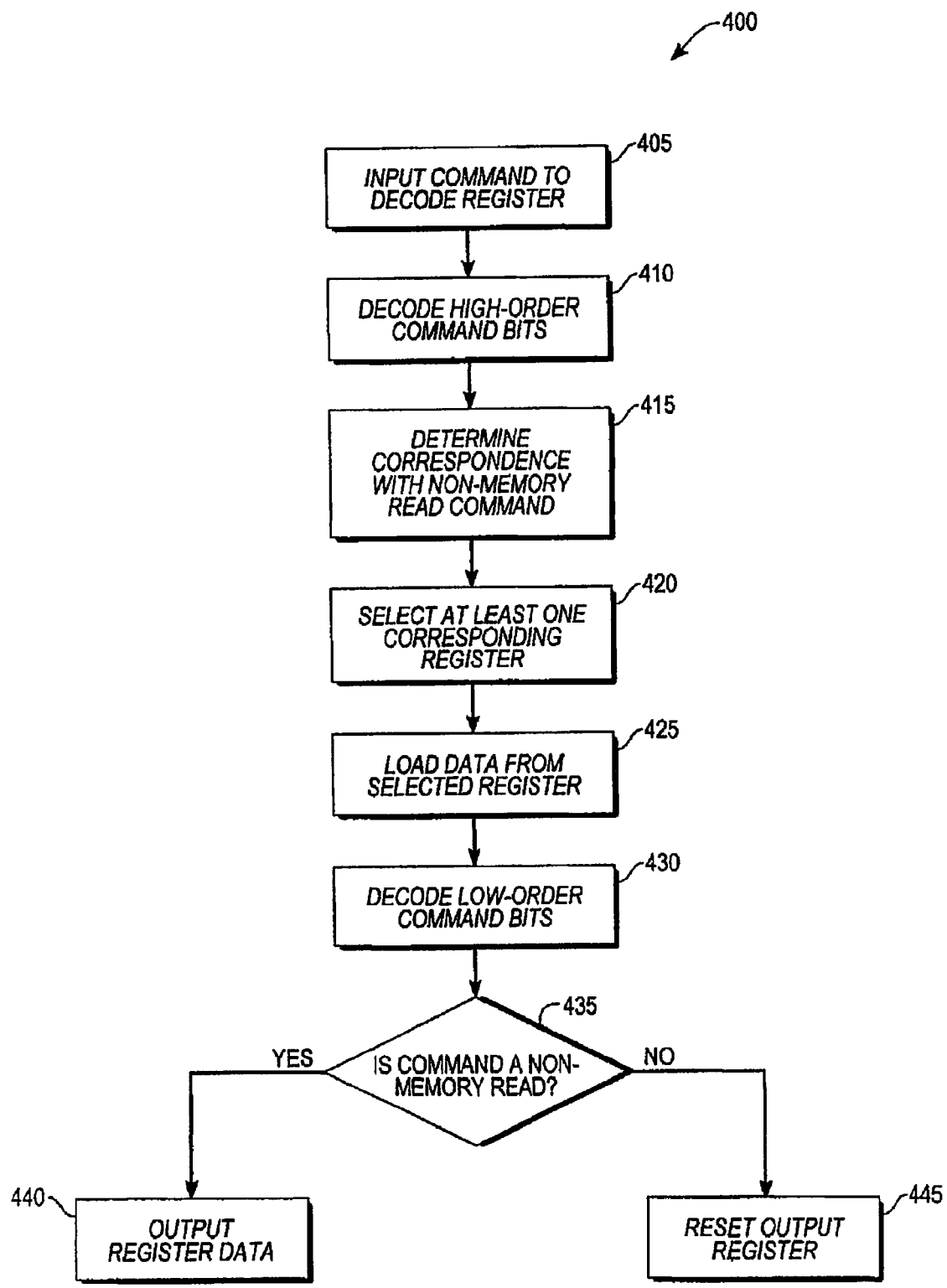
FIG. 4 is an exemplary process flow diagram of speculatively decoding commands corresponding to FIG. 1.

With reference to FIG. 4, inputting a command to a decode register of a serial interface (block 405) commences an exemplary process flow diagram 400 of speculatively decoding commands corresponding to FIG. 1. Next, a first portion of the command comprised of high-order command bits is determined (block 410) followed by determining if the first portion of the command decoded corresponds to the first portion of a non-memory read command (block 415). The process continues with selecting at least one data register corresponding to the non-memory read command (block 420) and loading data contents from the selected at least one data register to an output shift register (block 425). The process proceeds with decoding a final portion of the command, which is comprised of low-order command bits, to form a fully decoded command (block 430). If the fully decoded command is a non-memory read command (block 435), data contents from the selected at least one data register are output (block 440). If the fully decoded command is not a non-memory read command (block 435), contents of the output shift register are reset (block 445).

In practice, a person skilled in the art, may encode non-memory read commands with bit combinations that are unique within a first small portion of significant bits of the command bit field. For instance, in a serial interface subsystem it is possible for a fairly large number of commands to be available for assignment to non-memory read operations using the first six or five bits out of an 8-bit command field. By grouping the command bits of non-memory read commands in the most significant range of command bits, it is possible for the speculative decode of that command to be accomplished earlier in the cycle and leave even more system clock cycles available to speculatively process the command than exemplified above.

A speculative command decode device has been exemplified as a combination of a command decoder, logic block, multiplexer, and registers. As one skilled in the art would appreciate, other embodiments may be constructed of other logic elements and data manipulation means and still embody similar capabilities of speculative command and address decoding. Such alternate embodiments may act upon actual decode confirmation of register values for purposes of enhancing the speed of serial transactions. For instance, a decoder may be comprised of FPLA cells programmed to correspond with specific commands utilized in a subsystem and still achieve the same speculative decoding of the commands of focus.

A speculative command decode device has been exemplified as speculatively decoding commands of eight bit wide opcodes. A skilled artisan will recognize that the same operative principles exemplified will also work on opcodes of any bit-width. The speculative command decode device exemplified is applicable to any bit width opcode where a first portion of bits arrives in a sequence and can be decoded and compared with recognized system commands. A skilled artisan will also recognize that although the command decode device has been exemplified with opcodes having a most significant bit arrive first, opcodes with a least significant bit arriving first in a sequence would also be adaptable to the principles of the decode device.

What is claimed is:

1. A speculative command decode serial interface device comprising:
   an input line configured to serially receive command bits;
   a command register and decoder configured to decode a high-order portion of the command bits received serially on the same input line and produce a non-memory read command based on the higher-order portion of the command bits;
   at least one data register for retaining data associated with a corresponding non-memory read command;
   an interface logic block configured to produce a selection of non-memory read data and enable output of non-memory read data from the serial interface device, the interface logic block coupled to the command register and decoder and the at least one data register;
   a data multiplexer configured to provide read data from a selected one of the at least one data register the data multiplexer coupled to the at least one data register and the interface logic block;
   a data sequencer configured to queue read data, the data sequencer coupled to the interface logic block and the output of the data multiplexer;
   and an output register configured to output read data based on an enabling indication from the interface logic block, the output register coupled to the data sequencer and the interface logic block.

2. The speculative command decode serial interface device of claim 1, wherein the command register and decoder is configured to produce the non-memory read command upon determining an equivalence in corresponding bit positions between the non-memory read command and the high-order portion of the command bits.

3. The speculative command decode serial interface device of claim 1, wherein the command register and decoder is configured to produce the non-memory read command prior to receipt of a complete set of the command bits.

4. The speculative command decode serial interface device of claim 1, wherein the interface logic block is configured to produce a selection of non-memory read data based on the type of non-memory read command produced by the command register and decoder.

5. The speculative command decode serial interface device of claim 1, wherein the interface logic block is configured to enable output of the non-memory read data upon receipt of a complete non-memory read command from the command register and decoder, receipt of the complete non-memory read command confirming the non-memory read command speculatively produced.

6. The speculative command decode serial interface device of claim 1, wherein the interface logic block is configured to produce a selection of non-memory read data or memory read data upon receipt of a complete non-memory read command or memory read command respectively, from the command register and decoder.

7. The speculative command decode serial interface device of claim 1, wherein the interface logic block is configured to enable outputting a selection of non-memory read data or memory read data upon receipt of a complete read command, the complete read command confirming either the non-memory read data or the memory read data selection.

8. The speculative command decode serial interface device of claim 1, wherein the data multiplexer is configured to provide non-memory read data to the data sequencer according to the selection produced from the corresponding non-memory read command.

9. The speculative command decode serial interface device of claim 1, wherein the data sequencer is configured to output the non-memory read data upon an enabling indication from the interface logic block, the enabling indication produced subsequent to the command register and decoder receiving a complete non-memory read command.

10. The speculative command decode serial interface device of claim 1, wherein the data sequencer is configured to output non-memory read data or memory read data upon an enabling indication from the interface logic block, the respective enabling indication produced subsequent to the command register and decoder receiving a complete non-memory read command or a complete memory read command.

11. A speculative command decode serial interface device comprising:
    a means for decoding a high-order portion of command bits received serially on the same input line and producing a non-memory read command based on the higher-order portion of the command bits;
    at least one means for retaining non-memory read data related to a corresponding non-memory read command;

a means for determining data configured to determine a selection of non-memory read data and enable output of non-memory read data from the serial interface device, the means for determining coupled to the means for decoding and the at least one means for retaining;

a means for selecting data from one of the at least one means for retaining, the means for selecting being coupled to the at least one means for retaining and the means for determining;

a means for queuing data coupled to the means for determining and the means for selecting;

and a means for outputting read data based on an enabling indication from the means for determining, the means for outputting coupled to the means for queuing and the means for determining.

12. The speculative command decode serial interface device of claim 11, wherein the means for decoding speculatively is configured to produce the non-memory read command upon determining an equivalence in corresponding bit positions between the non-memory read command and the high-order portion of the command bits.

13. The speculative command decode serial interface device of claim 11, wherein the means for decoding speculatively is configured to produce the non-memory read command prior to receipt of a complete set of the command bits.

14. The speculative command decode serial interface device of claim 11, wherein the means for determining is configured to produce a selection of non-memory read data based on the type of non-memory read command produced by the means for decoding.

15. The speculative command decode serial interface device of claim 11, wherein the means for determining is configured to enable outputting of the non-memory read data upon receipt of a complete non-memory read command from the means for decoding, receipt of the complete non-memory read command confirming the non-memory read command produced.

16. The speculative command decode serial interface device of claim 11, wherein the means for determining is configured to produce a selection of non-memory read data or memory read data upon receipt of a complete non-memory read command or memory read command respectively, from the means for decoding.

17. The speculative command decode serial interface device of claim 11, wherein the means for determining is configured to enable outputting of a selection of either type of read data upon receipt of a complete read command, receipt of the complete read command confirming either the non-memory read data or the memory read data selection.

18. The speculative command decode serial interface device of claim 11, wherein the means for selecting is configured to provide non-memory read data to the means for queuing according to the selection produced from the corresponding non-memory read command.

19. The speculative command decode serial interface device of claim 11, wherein the means for queuing is configured to output the non-memory read data upon an enabling indication from the means for determining, the enabling indication produced subsequent to the means for decoding receiving a complete non-memory read command.

* * * * *